United States Patent
Kulkarni et al.

(10) Patent No.: US 11,623,739 B2
(45) Date of Patent: Apr. 11, 2023

(54) ELECTROMECHANICAL ACTUATOR WITH NO-BACK SYSTEM

(71) Applicant: Eaton Intelligent Power Limited, Dublin (IE)

(72) Inventors: Nikhil Mahesh Kulkarni, Thane (IN); Tyler Quincey Curtis, Rockford, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/508,569

(22) Filed: Oct. 22, 2021

(65) Prior Publication Data

US 2022/0126982 A1 Apr. 28, 2022

(51) Int. Cl.

| | |
|---|---|
| *F16D 55/00* | (2006.01) |
| *F16D 59/00* | (2006.01) |
| *F16H 25/24* | (2006.01) |
| *F16H 35/00* | (2006.01) |
| *F16H 25/22* | (2006.01) |
| *B64C 13/28* | (2006.01) |

(52) U.S. Cl.
CPC ............. *B64C 13/28* (2013.01); *F16D 55/00* (2013.01); *F16D 59/00* (2013.01); *F16H 25/2454* (2013.01); *F16H 2035/005* (2013.01)

(58) Field of Classification Search
CPC ........... F16H 25/2454; F16H 2035/005; F16H 25/2204; F16D 55/00; F16D 41/06; F16D 65/02; B64C 13/28
See application file for complete search history.

(56) References Cited

U.S. PATENT DOCUMENTS

| | | | | |
|---|---|---|---|---|
| 4,697,672 | A | * | 10/1987 | Linton ................... F16H 35/10 188/134 |
| 5,655,636 | A | * | 8/1997 | Lang ................... F16H 25/2021 188/134 |
| 5,944,148 | A | | 8/1999 | Bae et al. |
| 6,109,415 | A | | 8/2000 | Morgan et al. |
| 6,631,797 | B2 | * | 10/2003 | Capewell ................ B64C 13/28 184/5 |
| 10,520,070 | B2 | * | 12/2019 | Turpin ................ F16H 25/2454 |
| 11,181,073 | B2 | * | 11/2021 | Werquin ................. F02K 1/763 |
| 11,370,528 | B2 | * | 6/2022 | Popov ........................ B64C 3/50 |
| 2008/0000730 | A1 | | 1/2008 | Port-Robach et al. |
| 2016/0369877 | A1 | * | 12/2016 | Gitnes ................. F16H 25/2454 |
| 2021/0380225 | A1 | * | 12/2021 | Popov ..................... B64C 13/40 |
| 2022/0185448 | A1 | * | 6/2022 | Rozeboom ............. B64C 13/34 |

FOREIGN PATENT DOCUMENTS

| | | |
|---|---|---|
| FR | 2 874 982 A1 | 3/2006 |
| WO | 2009/151423 A1 | 12/2009 |

OTHER PUBLICATIONS

Great Britain Search Report for Application No. 2115410.9 dated Apr. 12, 2022.
Extended European Search Report for Application No. 21205097.5 dated Jan. 24, 2022.

\* cited by examiner

*Primary Examiner* — Tinh Dang

(74) *Attorney, Agent, or Firm* — Merchant & Gould P.C.

(57) ABSTRACT

A compact, efficient, and reliable electromechanical actuator that is capable of driving heavy loads at a high rate of speed and also capable of resisting large back driving forces. The actuator resists tension and compression back driving forces in a static state as well as when the actuator extends and retracts. The back driving forces are resisted even if the electronics (e.g., motor) fail.

17 Claims, 21 Drawing Sheets

ELECTROMECHANICAL ACTUATOR WITH NO-BACK SYSTEM

CROSS-REFERENCE TO RELATED APPLICATION

This application claims the benefit of Indian Provisional Patent Application No. 202011046739, filed on Oct. 27, 2020, the disclosure of which is incorporated herein by reference in its entirety.

BACKGROUND

Actuators are commonly used to control and drive motion. Two common types of actuators are a hydraulic actuator and an electromechanical actuator. Typically, hydraulic actuators are preferred over electromechanical actuators in applications that involve driving heavy loads at a relatively high rate of speed. However, in certain applications, it can be desirable to drive heavy loads at high rates of speed with electromechanical actuation. In such applications, an electromechanical ball screw type actuator may be used. The pitch of a ball screw actuator can be adjusted to drive loads at faster rates of speed, however back driving forces can then become a challenge. In some applications, it is very important that large back driving forces are resisted even if the motor that drives the actuator fails. Various no-backing systems have been developed to account for back driving forces. An example of a ball screw system with a no-back device is disclosed in U.S. Pat. No. 6,109,415 to Morgan et al. filed on May 29, 1998. Improved actuation systems are desired.

SUMMARY

The present disclosure provides a compact, efficient, and reliable electromechanical actuator that is capable of driving heavy loads at a high rate of speed and also capable of resisting large back driving forces. The actuator resists tension and compression back driving forces in a static state as well as when the actuator extends and retracts. The back driving forces are resisted even if the electronics (e.g., motor) fail.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications, and equivalents, which may be included within the spirit and scope of the invention as defined by the appended claims.

The actuator of the depicted embodiment can be used in a wide range of applications. One example application for the actuator of the present disclosure is to extend and retract flaps on a wing of an airplane. The actuator in this example context must be able to drive large forces at a relatively high rate of speed. The back driving forces from the airflow across the wings can be substantial. It should be appreciated that many other applications and configurations are possible.

It is desirable to resist these back driving forces so that the flaps maintain their position even if there is a failure in the system (e.g., a failure of the electrical motor). In the context of an actuator that controls the position of flaps on an aircraft, it is better that the flaps fail to move as directed but hold their position than fail to move as directed and also fail to hold their position. It should be appreciated that many other applications are possible.

Figure 1:
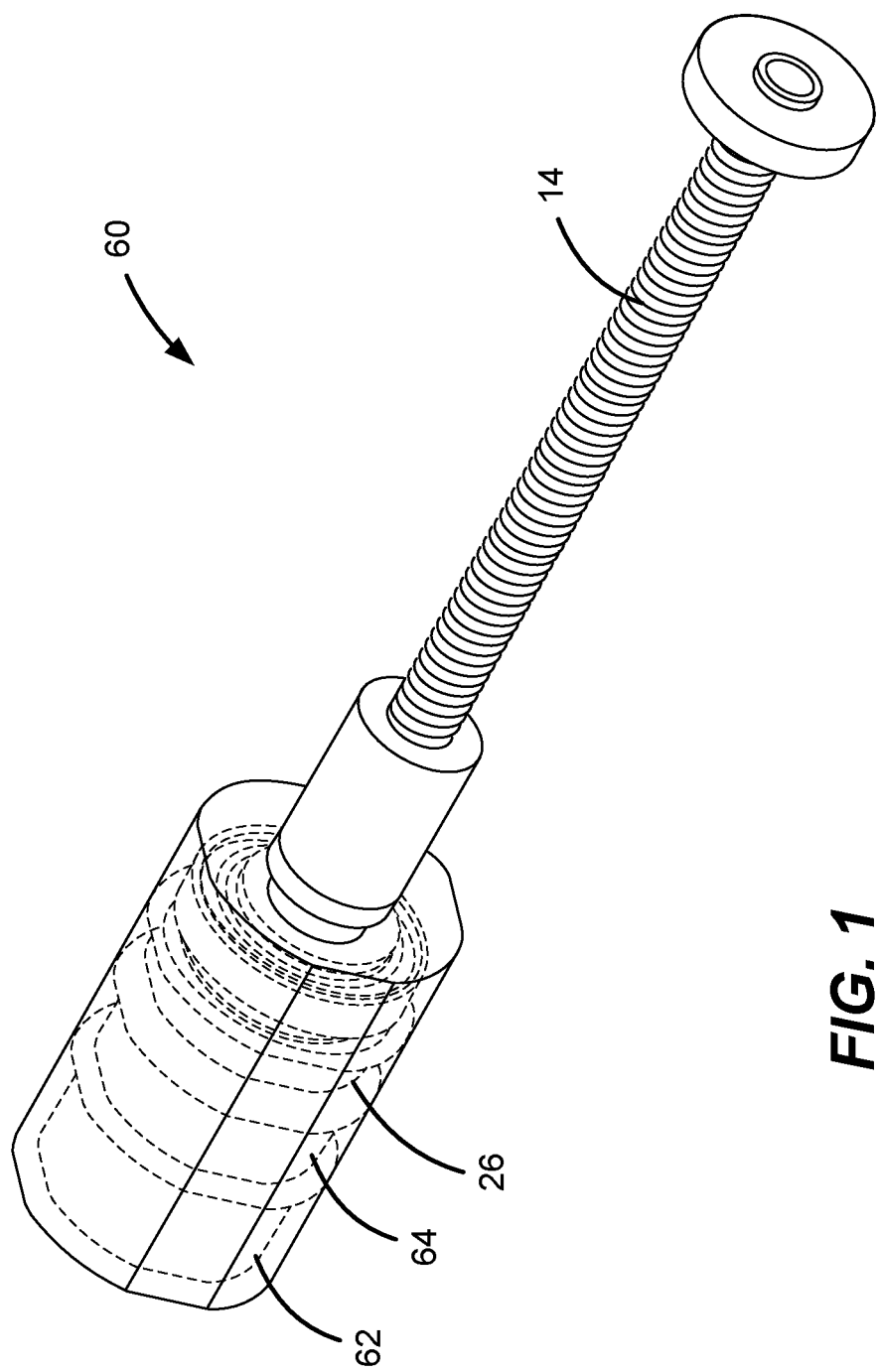
FIG. 1 is an isometric view of an embodiment of the actuator according to the principles of the present disclosure.

Referring to FIG. 1, in the depicted embodiment, the principles of the present disclosure are incorporated into a ball screw type electromechanical actuator 60. In the depicted embodiment, the actuator 60 includes a motor 62 that drives a gear box 64 within a housing 26. A ball screw drive shaft 14 extends into the housing 26 and is driven to rotate about its longitudinal axis by the gear box 64. Rotation of the ball screw drive shaft 14 about its longitudinal axis linearly drives the nut 66 along the ball screw drive shaft 14. The object being actuated (e.g., flaps of an aircraft wing) is connected to the nut 66. It should be appreciated that certain aspects of the present disclosure are applicable to actuators that are not considered to be a ball screw type actuator.

In the depicted embodiment, when the ball screw drive shaft 14 is rotated in a first direction, the nut 66 is driven extending away from the housing 26. When the ball screw drive shaft 14 is rotated in a second direction, the nut 66 is retracted.

It should be appreciated that the back driving force (e.g., air pressure on the flaps) can apply either a tension force on the ball screw drive shaft 14 (force acting in the direction to extend the actuator 60) or a compression force on the ball screw drive shaft 14 (force acting in the direction to retract the actuator 60). Regardless of the direction, the system of the present disclosure is configured to resist the back driving force. The system is configured such that the back driving force can be resisted without electrical power. In the event the electronics fail, the ball screw drive shaft 14 holds its position despite external forces acting on the ball screw drive shaft 14.

Figure 2:
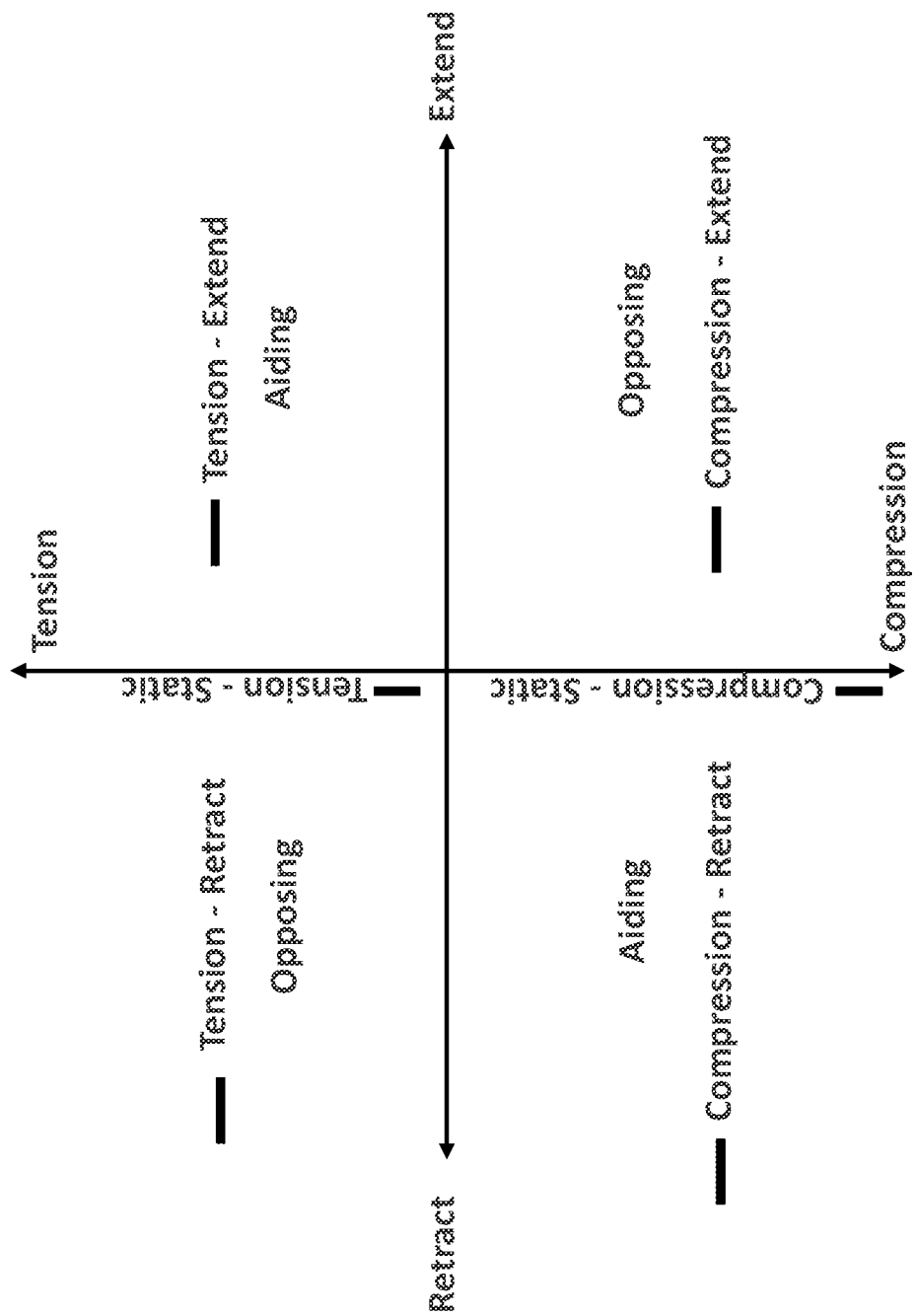
FIG. 2 identifies a number of possible operating scenarios of the actuator according to the principles of the present disclosure.

Table 1 identifies and describes six of the operational scenarios depicted in FIG. 2.

screw flange 12 and the second static disk first compression skewed roller engagement surface 18 of the second static disk 20. The second static disk sprag clutch engagement cylindrical surface 22 of the second static disk 20 is engaged with the second sprag clutch 24. The second sprag clutch 24 is orientated to resist relative rotation of the second static disk 20 and the housing 26 in the clockwise direction (second direction) and allows free relative rotation of the second static disk 20 and the housing 26 in the counter-clockwise direction (first direction). The second static disk second compression skewed roller engagement surface 28 is driven against the second compression skewed roller assembly 30. The second compression skewed roller assembly 30 is driven against the second disk member 32 which is splined to the second end portion 34 of the ball screw drive shaft 14 and configured to rotate with the ball screw drive shaft 14. The second disk member 32 bottoms out on a bearing assembly (e.g., thrust bearing) 36, which backs up against the housing 26. It should be appreciated that many other alternative configurations are also possible. For example, the clutch could instead be any one-way clutch (e.g., drawn cup roller clutch, etc.) or another selective braking mechanism.

TABLE 1

| State | Back Driving Forces | Motor | Operation |
| --- | --- | --- | --- |
| Condition 1 See FIG. 2 (down the Y-axis) | Compressive | Static | Left side of the no-back system is engaged and holds position |
| Condition 2 See FIG. 2 (up the Y-axis) | Tension | Static | Right side of the no-back system is engaged and holds position |
| Condition 3 See FIG. 2 (lower left quadrant) | Compressive | Retract | Left side of the no-back system is engaged; Motor overcomes the friction on the left side of the no-back system and the actuator retracts |
| Condition 4 See FIG. 2 (lower right quadrant) | Compressive | Extend | Motor overcomes the compressive back driving force; right side of the no-back system is not engaged; left side of the no-back system is locked but the sprag allows free rotation; actuator extends |
| Condition 5 See FIG. 2 (upper left quadrant) | Tension | Retract | Motor overcomes the tension back driving force; left side of the no-back system is not engaged; right side of the no-back system is locked but the sprag allows free rotation; actuator retracts |
| Condition 6 See FIG. 2 (upper right quadrant) | Tension | Extend | Right side of the no-back system is engaged; Motor overcomes the friction on the right side of the no-back system and the actuator extends |

Figure 3:
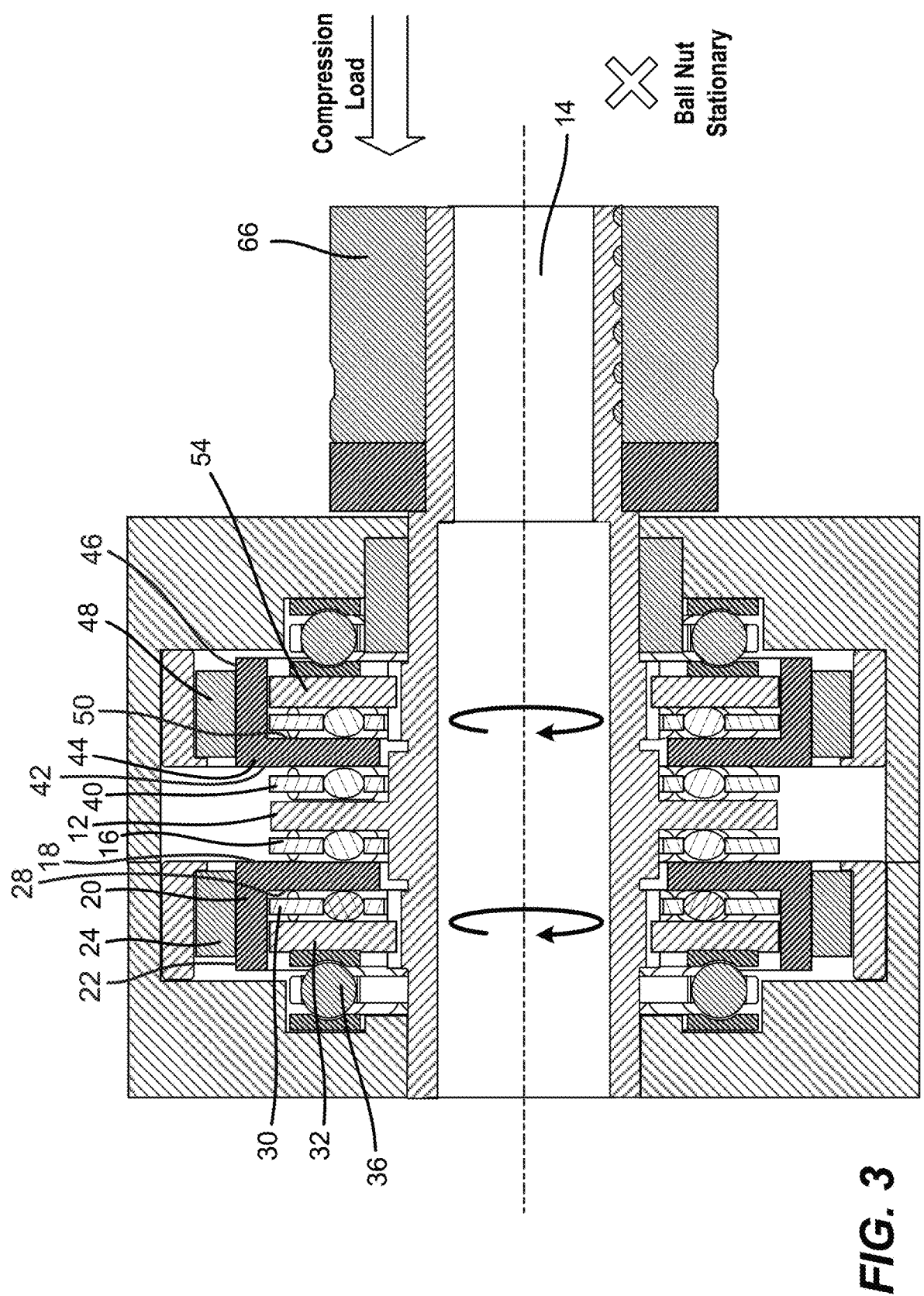
FIG. 3 is a cross-section of the actuator of the present disclosure in condition 1 where there exists a compressive back driving load and no motor applied load.
Figure 4:
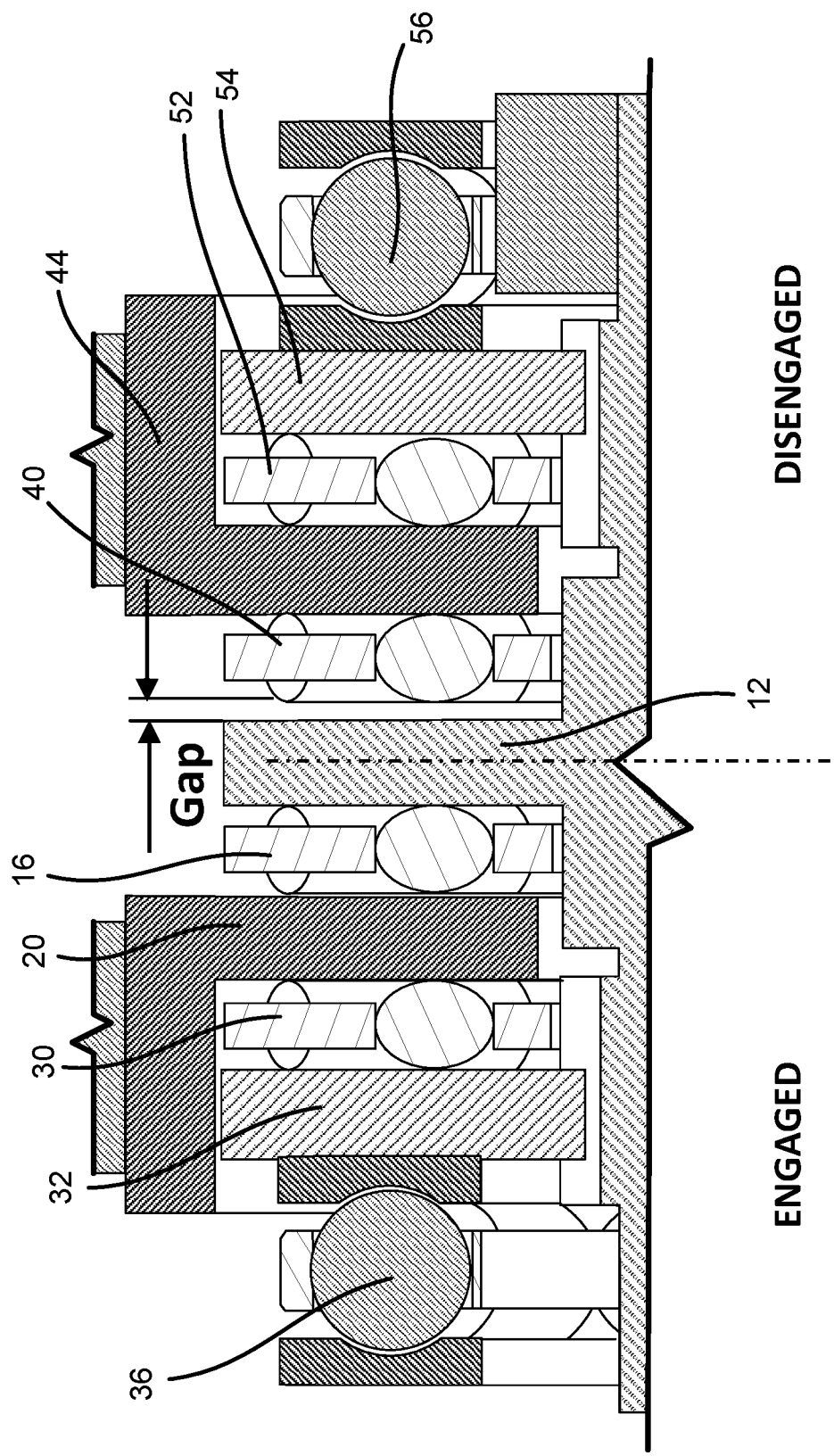
FIG. 4 is an enlarged portion of FIG. 3.

Referring to FIGS. 3-4, the operating condition 1 is described in further detail. In the depicted embodiment and operating condition, the left side (second side) of the no-back system 10 is engaged and holds the position of the actuator 60. The right side (first side) of the no-back system 10 is disengaged. As shown in FIG. 3, the radially extending ball screw flange 12 is biased towards the left due to the external compressive back driving load on the ball screw drive shaft 14. It should be appreciated that many other alternative configurations are also possible. For example, in an alternative configuration, the nut 66 rotates and the ball screw translates.

In the depicted embodiment, the ball screw flange 12 presses against the first compression skewed roller assembly 16 which is positioned between the radially extending ball In the depicted embodiment, the left side of the no-back system 10 is compressed by the compressive load and resists the back driving external force that would otherwise cause the actuator 60 to retract. In the depicted embodiment, the resistance of the back driving force does not depend on the motor or electrical system being functional. Hence, the failure mode for this system is that it holds the position of the actuator 60 even if a compressive external back driving force is applied to the system. It should be appreciated that many other alternative configurations are also possible.

Figure 5:
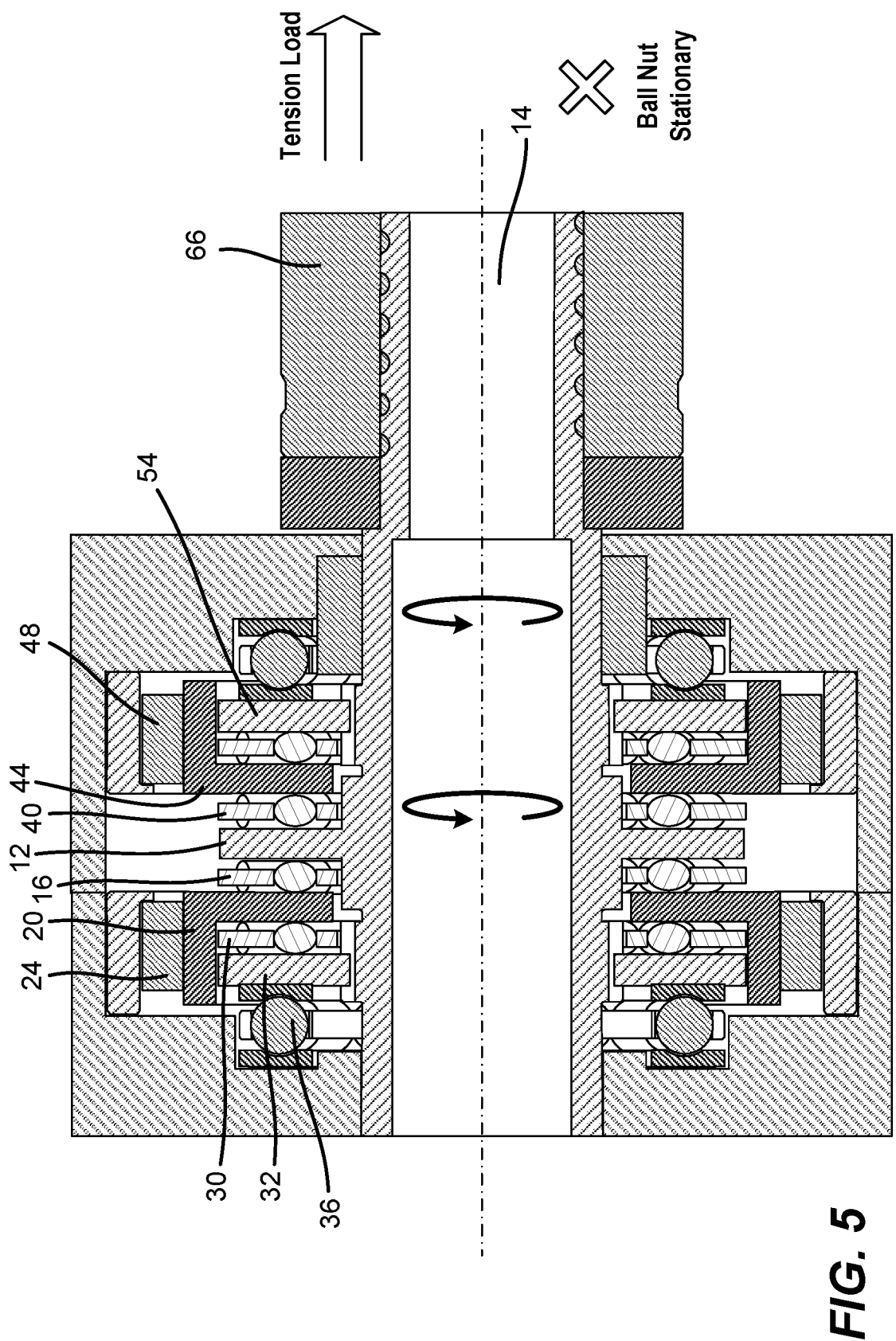
FIG. 5 is a cross-section of the actuator of the present disclosure in condition 2 where there exists a tension back driving load and no motor applied load.
Figure 6:
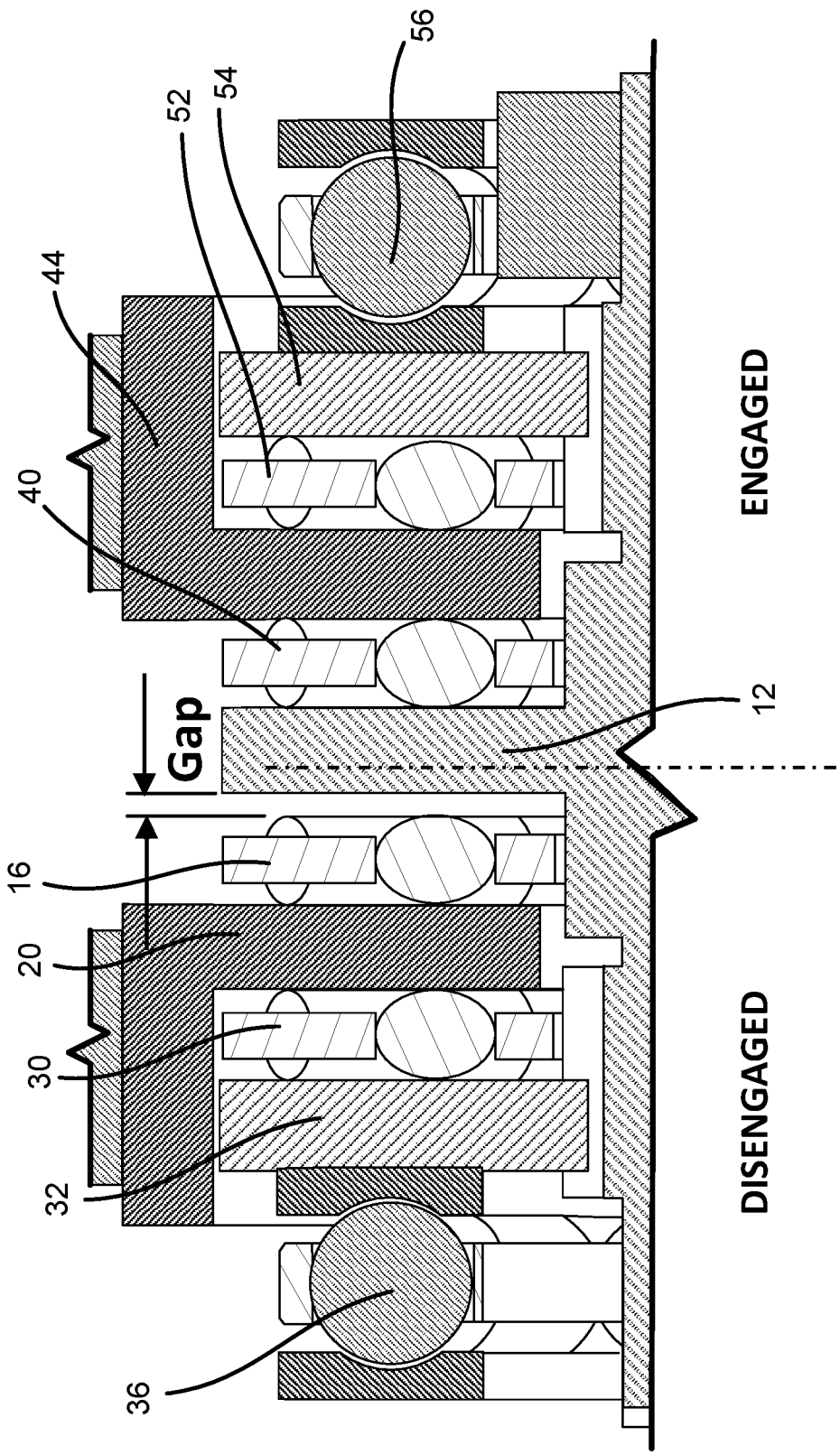
FIG. 6 is an enlarged portion of FIG. 5.

Referring to FIGS. 5-6, the operating condition 2 is described in further detail. In the depicted embodiment and operating condition, the right side (first side) of the no-back system 10 is engaged and holds the position of the actuator 60. The left side (second side) of the no-back system 10 is disengaged. As shown in FIG. 5, the radially extending ball screw flange 12 is biased towards the right due to the external tension back driving load on the ball screw drive shaft 14. It should be appreciated that many other alternative configurations are also possible.

In the depicted embodiment, the ball screw flange 12 presses against the first tension skewed roller assembly 40, which is positioned between the radially extending ball screw flange 12 and the first static disk first tension skewed roller engagement surface 42 of the first static disk 44. The first static disk sprag clutch engagement cylindrical surface 46 of the first static disk 44 is engaged with the first sprag clutch 48. The first sprag clutch 48 is orientated to resist relative rotation of the first static disk 44 and the housing 26 in the counterclockwise direction (first direction) and allows free relative rotation of the first static disk 44 and the housing 26 in the clockwise direction (second direction). The first static disk second tension skewed roller engagement surface 50 is driven against the second tension skewed roller assembly 52. The second tension skewed roller assembly 52 is driven against the first disk member 54, which is splined to the second end portion 34 of the ball screw drive shaft 14 and configured to rotate with the ball screw drive shaft 14. The first disk member 54 bottoms out on a bearing assembly (e.g., thrust bearing) 56, which backs up against the housing 26. It should be appreciated that many other alternative configurations are also possible.

In the depicted embodiment, the right side of the no-back system 10 is under compression imparted by the back driving tension load. The system is configured to resist the back driving external force that would otherwise cause the actuator 60 to extend. In the depicted embodiment, the resistance of the back driving force does not depend on the motor or electrical system being functional. Hence, the failure mode for this system is that it holds the position of the actuator 60 even if a compressive external back driving force is applied to the system. It should be appreciated that many other alternative configurations are also possible.

Figure 7:
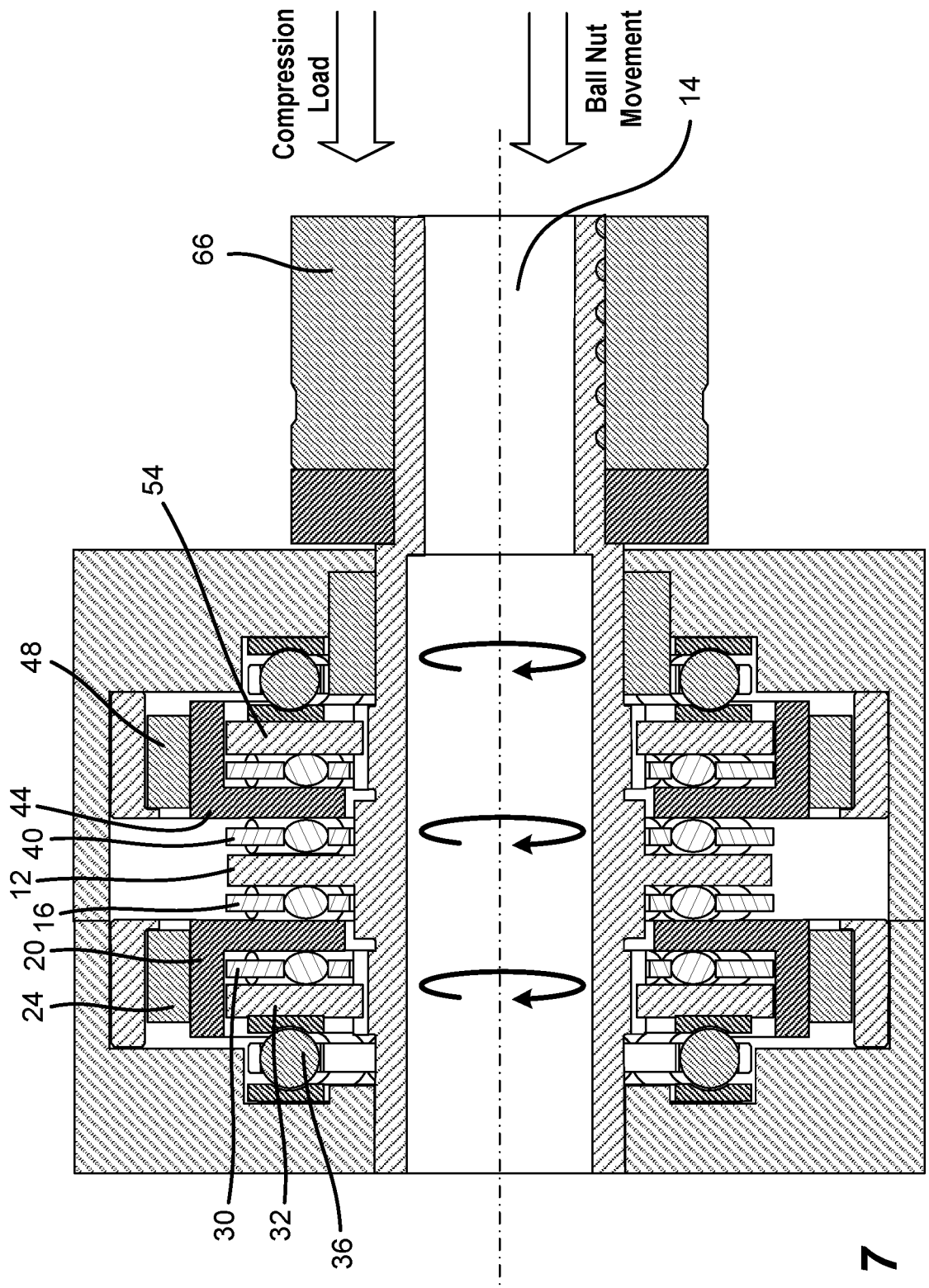
FIG. 7 is a cross-section of the actuator of the present disclosure in condition 3 where there exists a compressive back driving load and the actuator is driven to retract.
Figure 8:
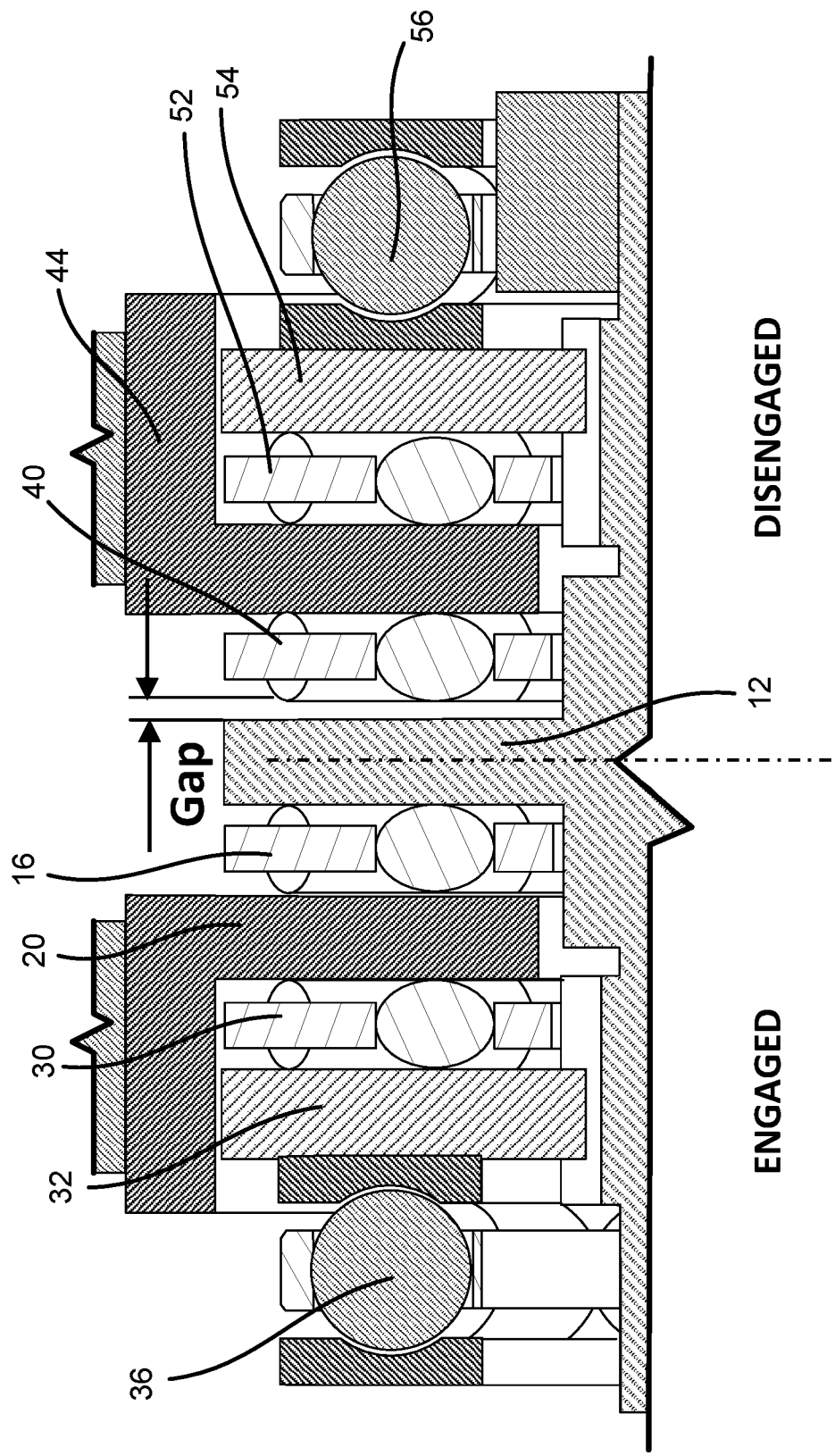
FIG. 8 is an enlarged portion of FIG. 7.

Referring to FIGS. 7-8, the operating condition 3 is described in further detail. In the depicted embodiment and operating condition, the back driving force is compressive and the motor 62 is driven to retract the actuator 60. In this operating condition, the left side of the no-back system 10 is engaged and the right side of the no-back system 10 is disengaged. The motor 62 overcomes the friction on the left side of the no-back system 10 and the actuator 60 retracts. It should be appreciated that many other alternative configurations are also possible.

Figure 9:
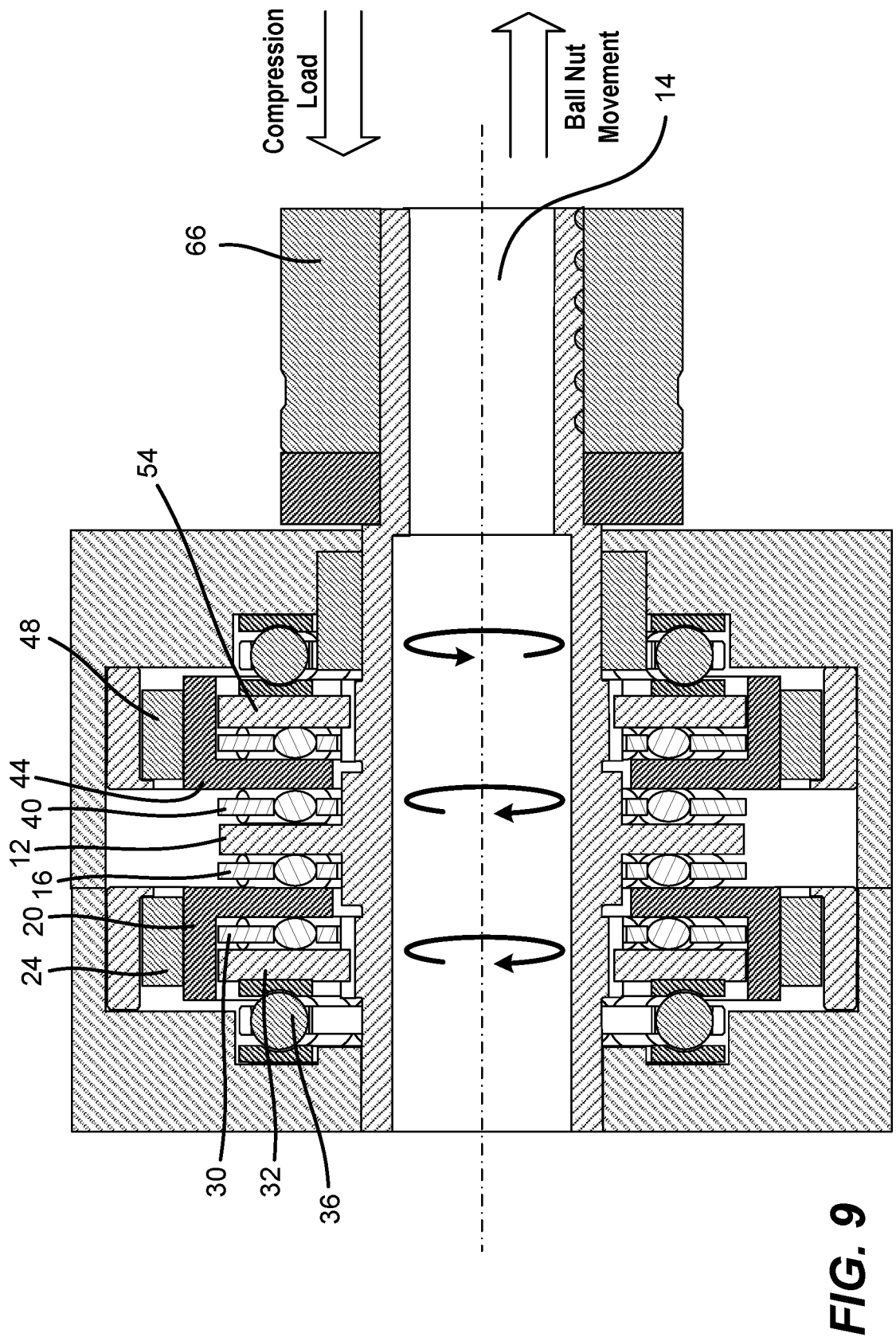
FIG. 9 is a cross-section of the actuator of the present disclosure in condition 4 where there exists a compressive back driving load and the actuator is driven to extend.
Figure 10:
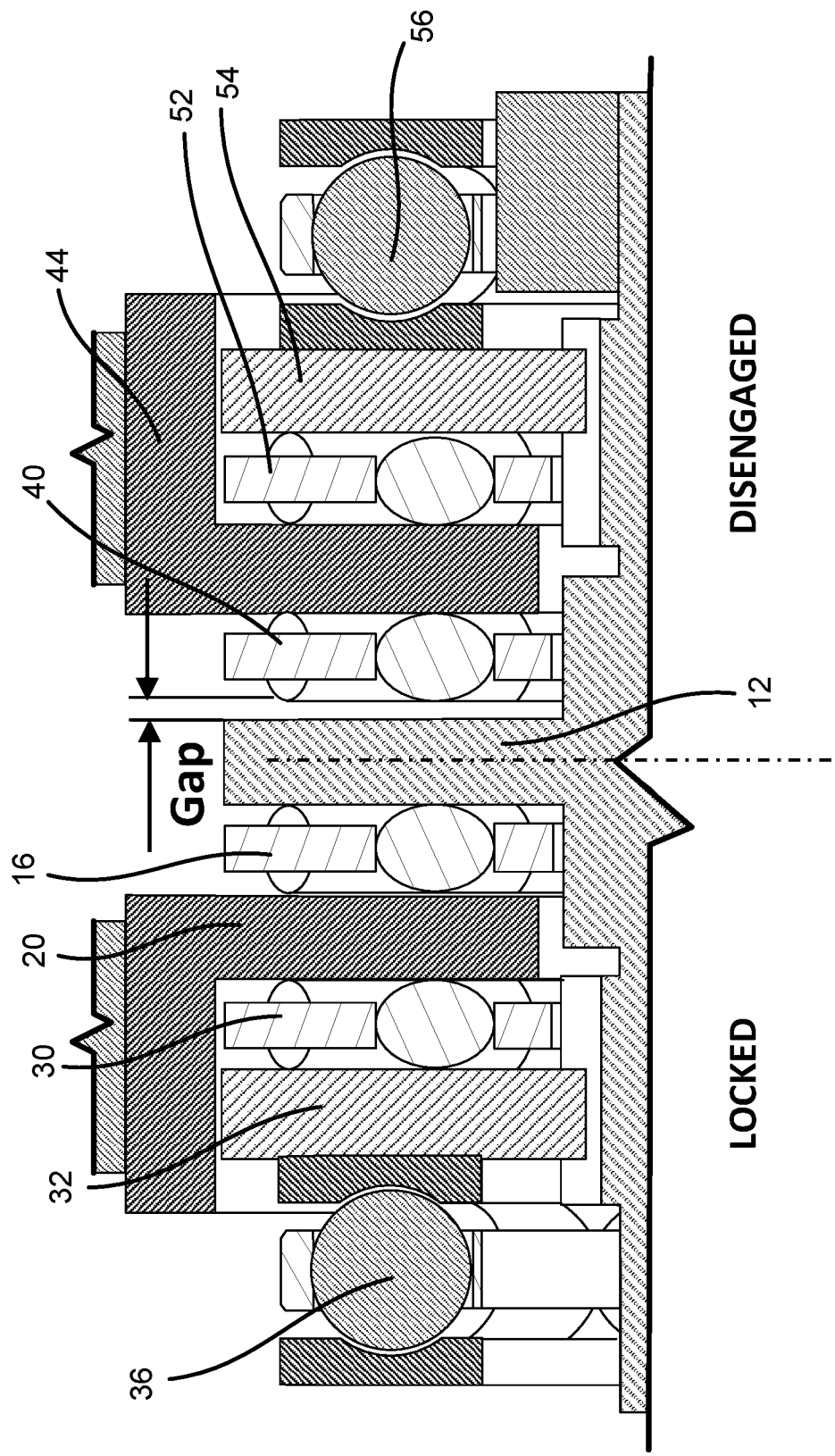
FIG. 10 is an enlarged portion of FIG. 9.

Referring to FIGS. 9-10, the operating condition 4 is described in further detail. In the depicted embodiment and operating condition, the back driving force is compressive and the motor 62 is driven to retract. In this operating condition, the motor 62 overcomes the compressive back driving force. The right side of the no-back system 10 is not engaged, and the left side of the no-back system 10 is locked in that the first and second compression skewed rollers 16, 30 are engaged with the second static disk 20 and the second disk member 32. However, the second sprag clutch 24 allows for free rotation in the counterclockwise direction (first direction) and resists rotation in the clockwise direction (second direction). The ball screw driving direction is counterclockwise (first direction), therefore the no-back system 10 does not resist the motor 62. It should be appreciated that many other alternative configurations are also possible.

Figure 11:
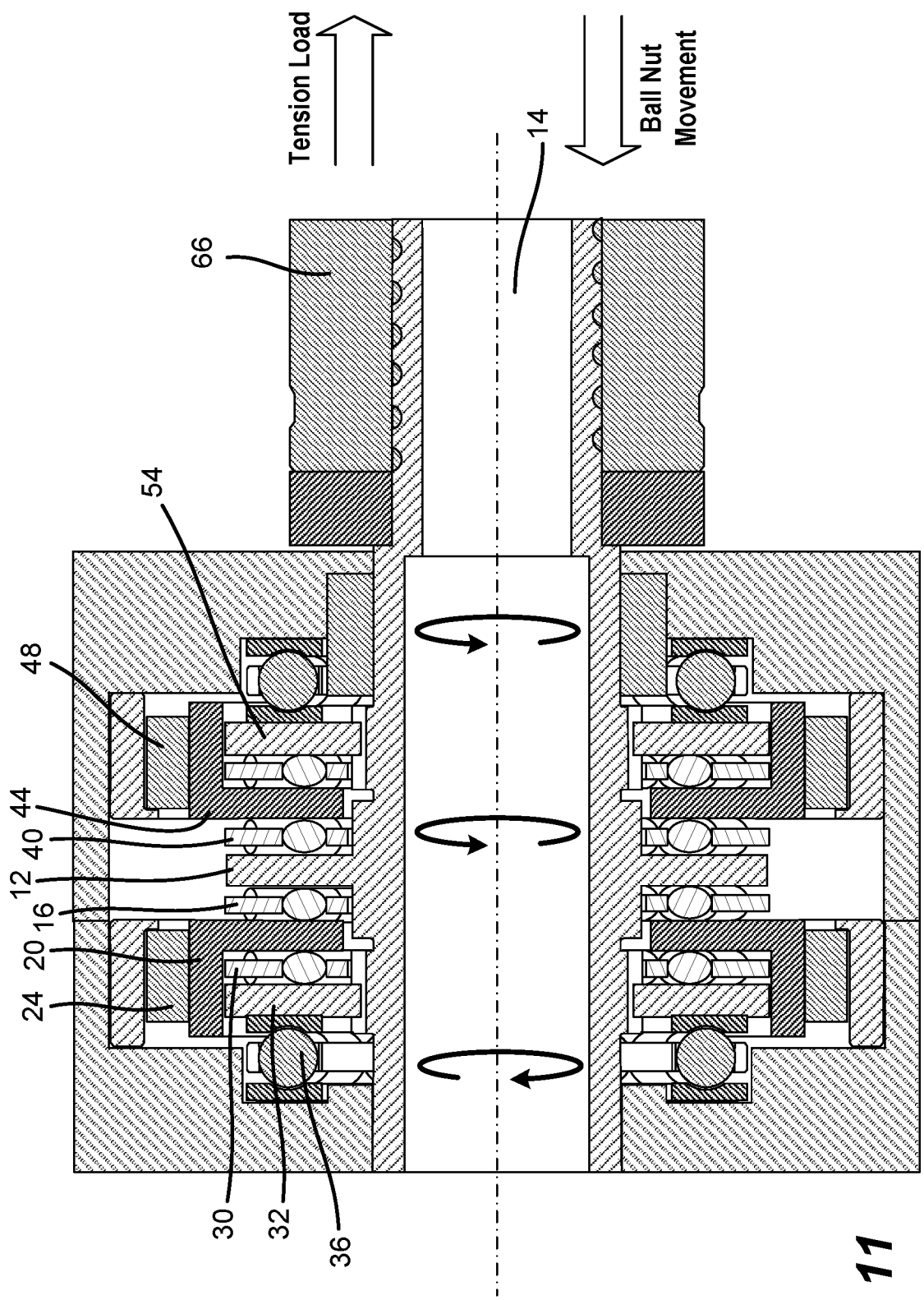
FIG. 11 is a cross-section of the actuator of the present disclosure in condition 5 where there exists a tension back driving load and the actuator is driven to retract.
Figure 12:
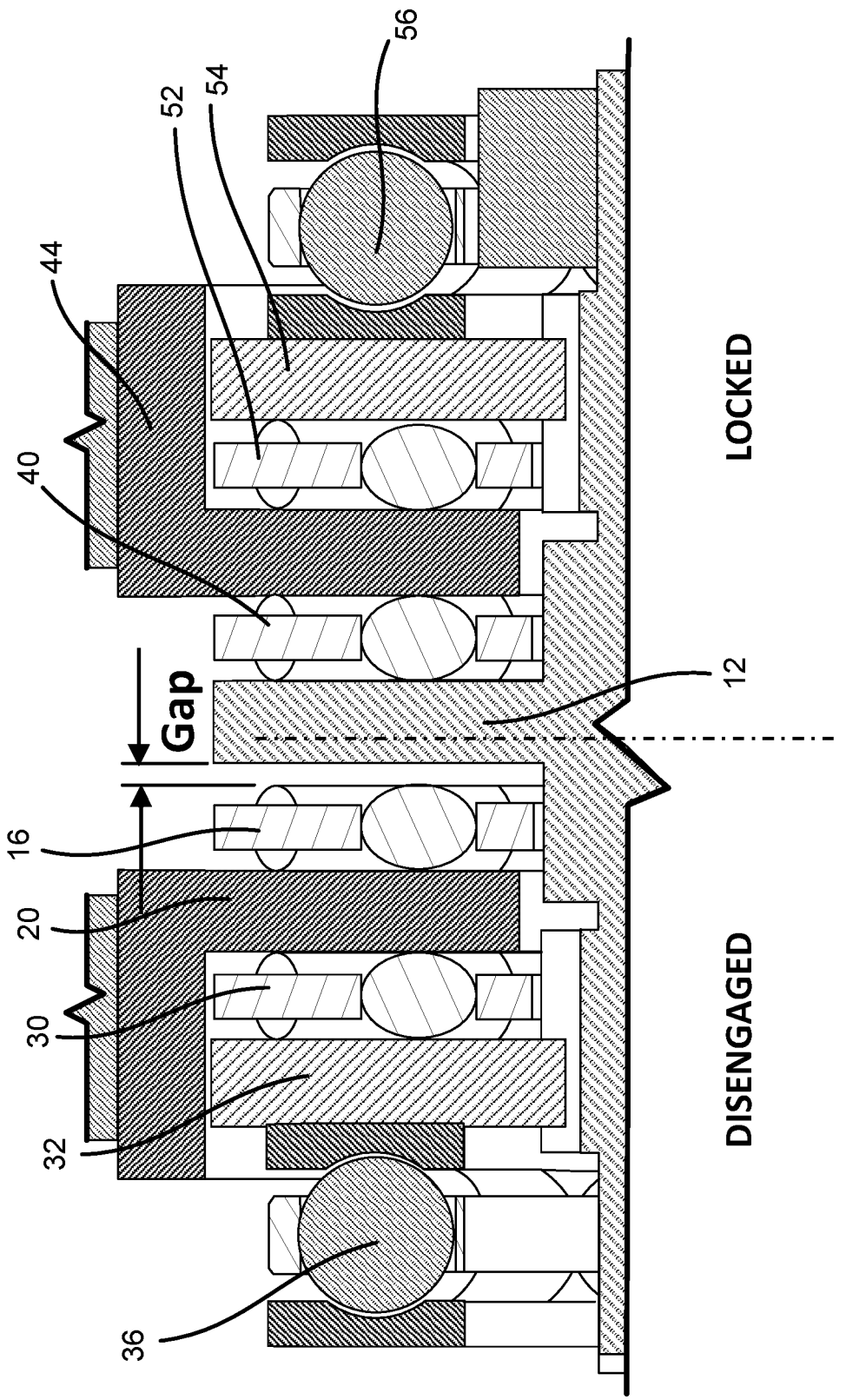
FIG. 12 is an enlarged portion of FIG. 11.

Referring to FIGS. 11-12, the operating condition 5 is described in further detail. In the depicted embodiment and operating condition, the back driving force results in tension and the motor 62 is driven clockwise to retract. The motor 62 overcomes the tension back driving force, and the left side of the no-back system 10 is not engaged. The right side of the no-back system 10 is locked in that the first and second tension skewed roller assemblies 40, 52 are engaged but the first sprag clutch 48 allows free rotation in the clockwise direction (second direction), and the actuator 60 retracts without resistance from the no-back system 10 as the ball screw drive shaft 14 rotates in the clockwise direction to drive retraction. It should be appreciated that many other alternative configurations are also possible.

Figure 13:
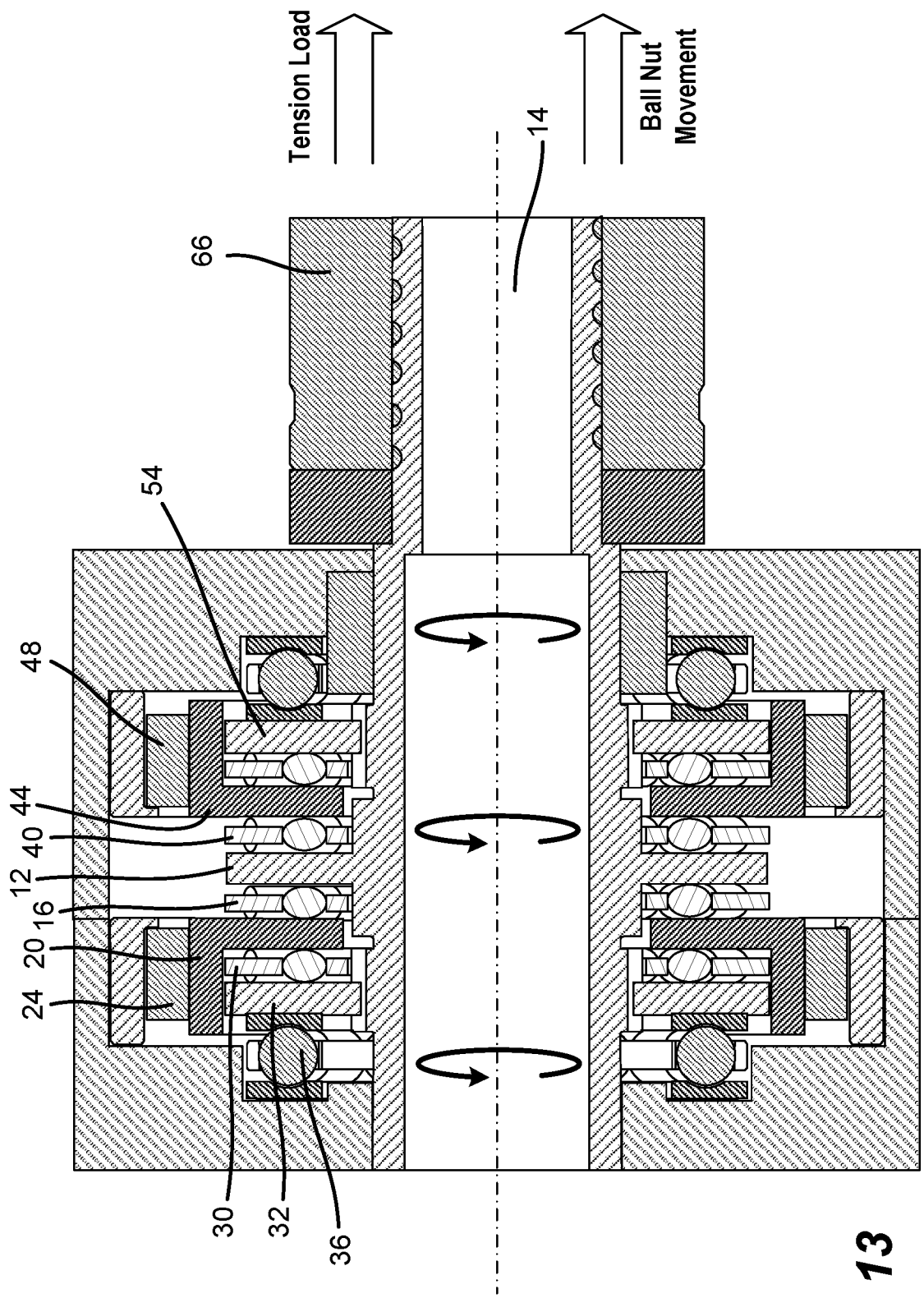
FIG. 13 is a cross-section of the actuator of the present disclosure in condition 6 where there exists a tension back driving load and the actuator is driven to extend.
Figure 14:
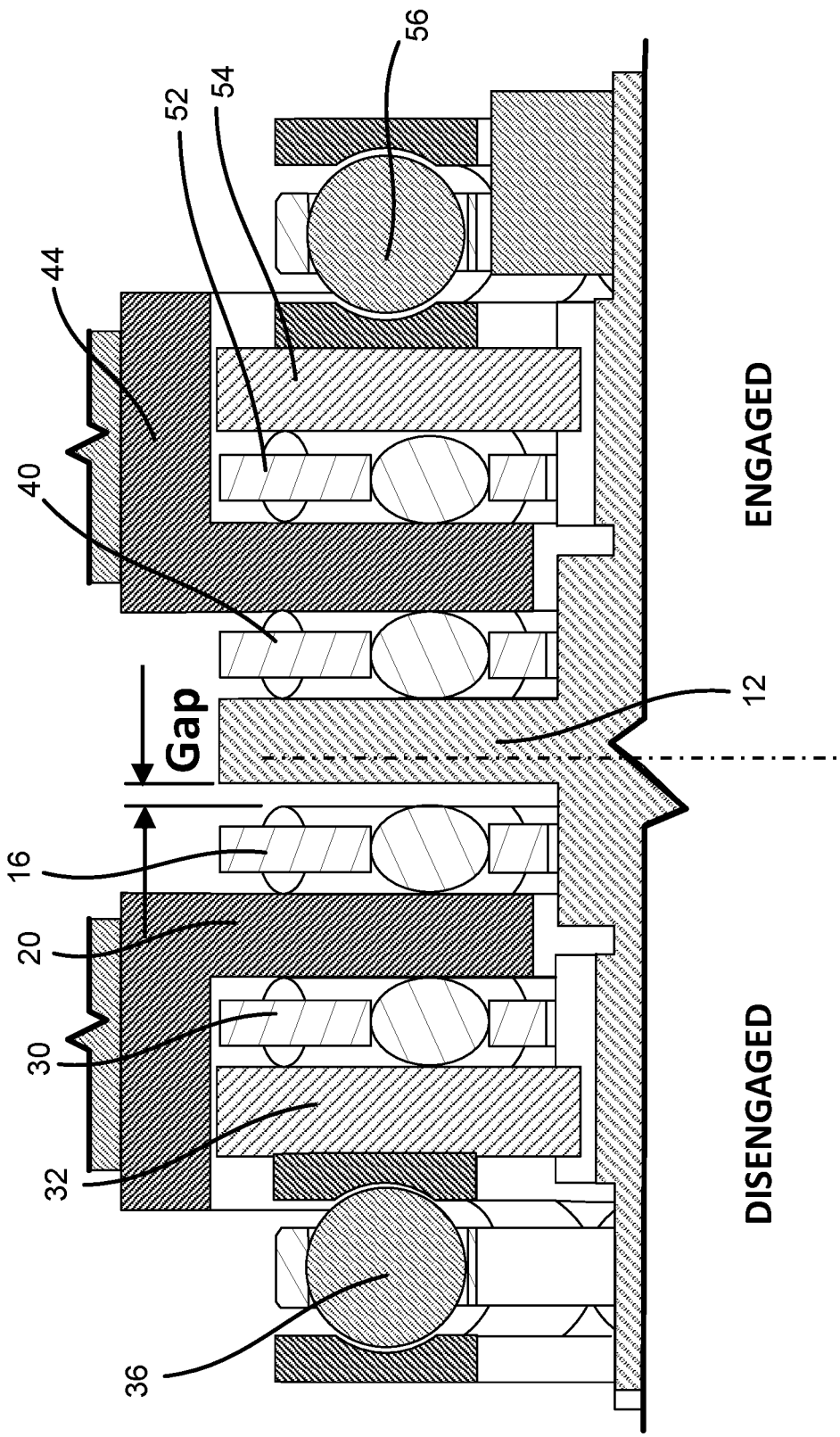
FIG. 14 is an enlarged portion of FIG. 13.
Figure 15:
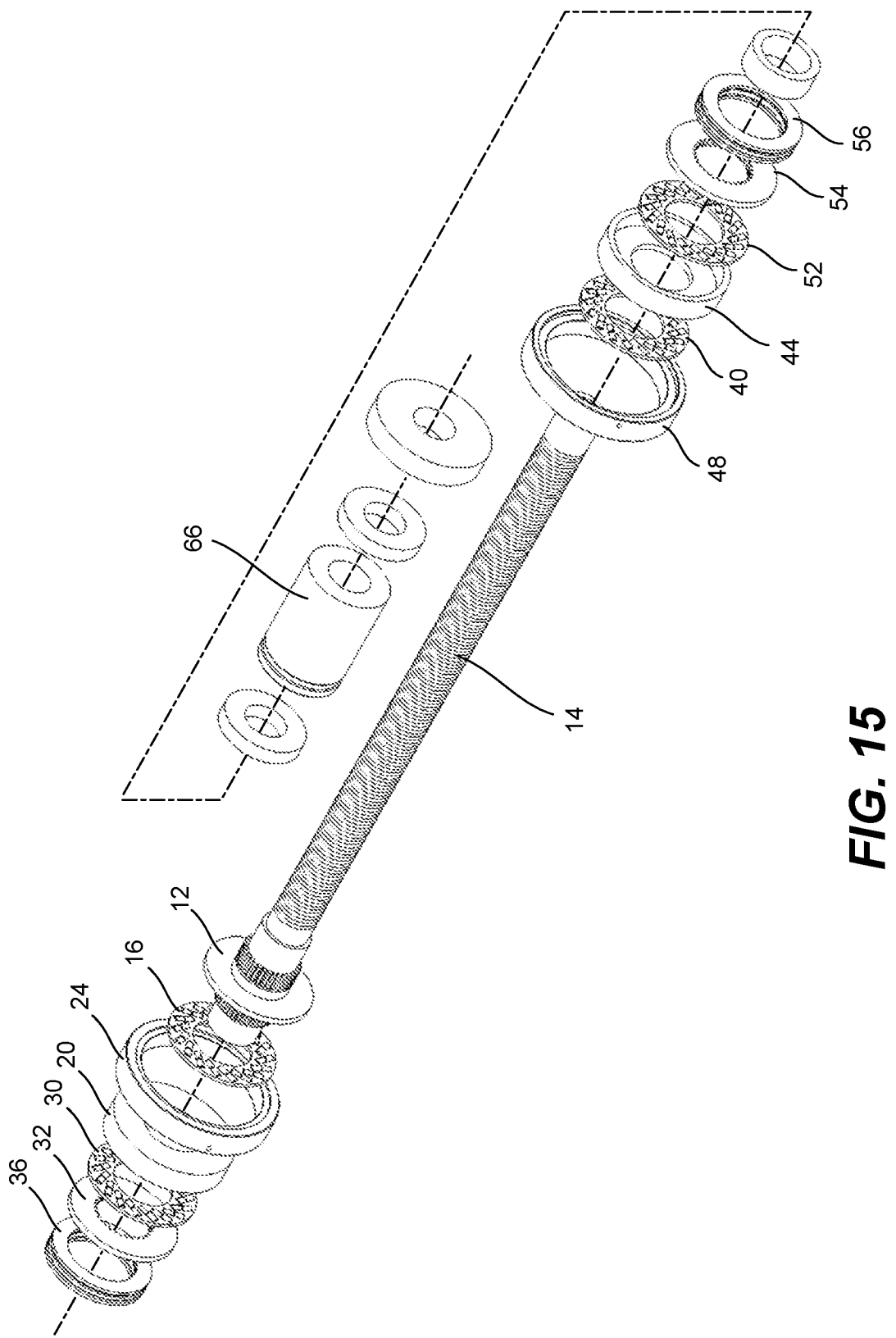
FIG. 15 is an exploded assembly view of a portion of the actuator of FIG. 1.
Figure 16:
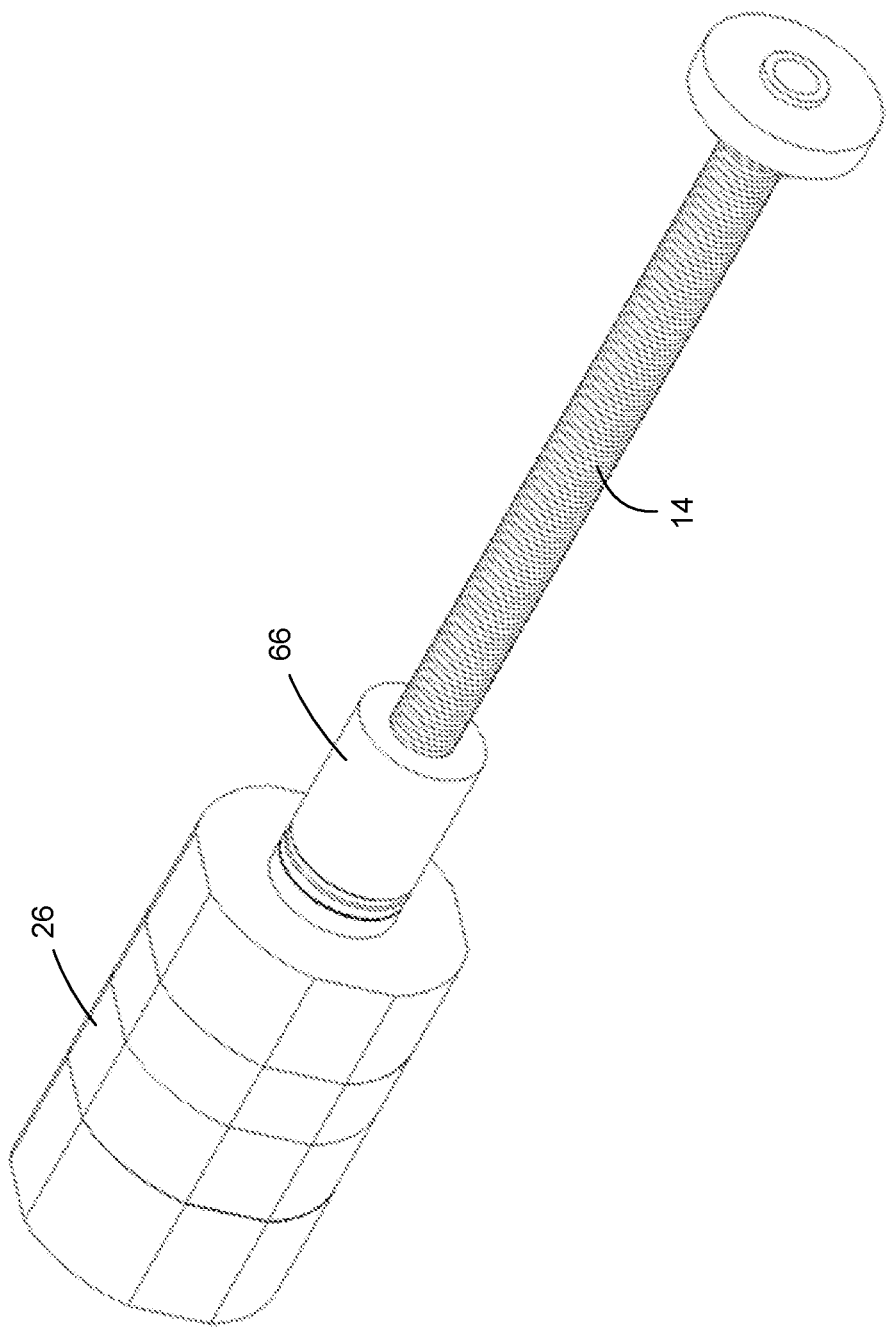
FIGS. 16-20 are additional line drawings of the actuator according to the principles of the present disclosure.
Figure 17:
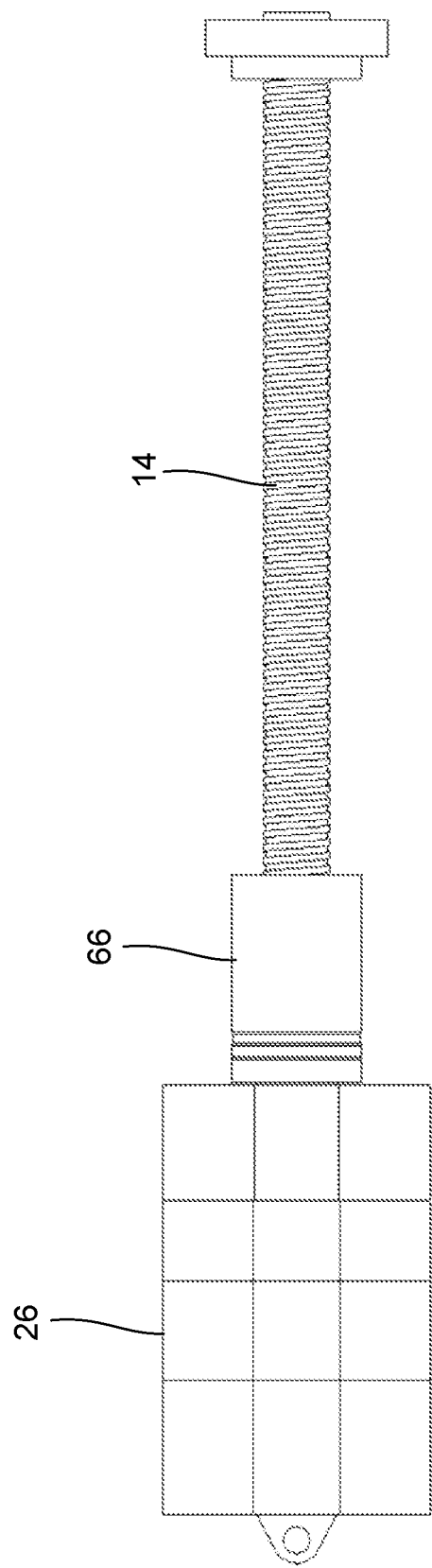
Figure 18:
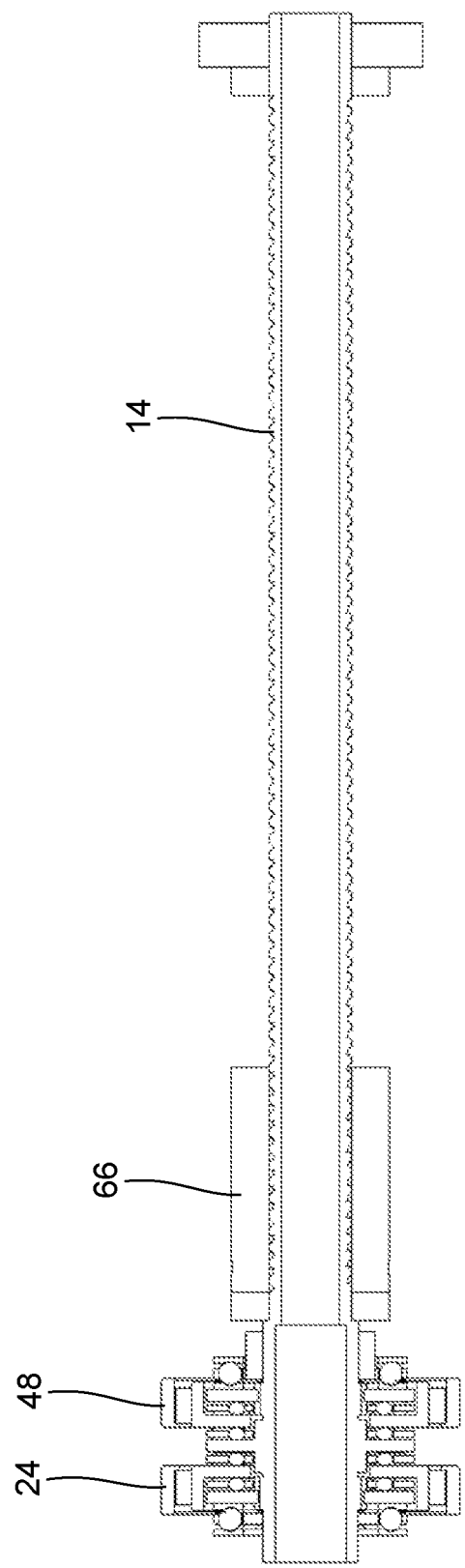
Figure 19:
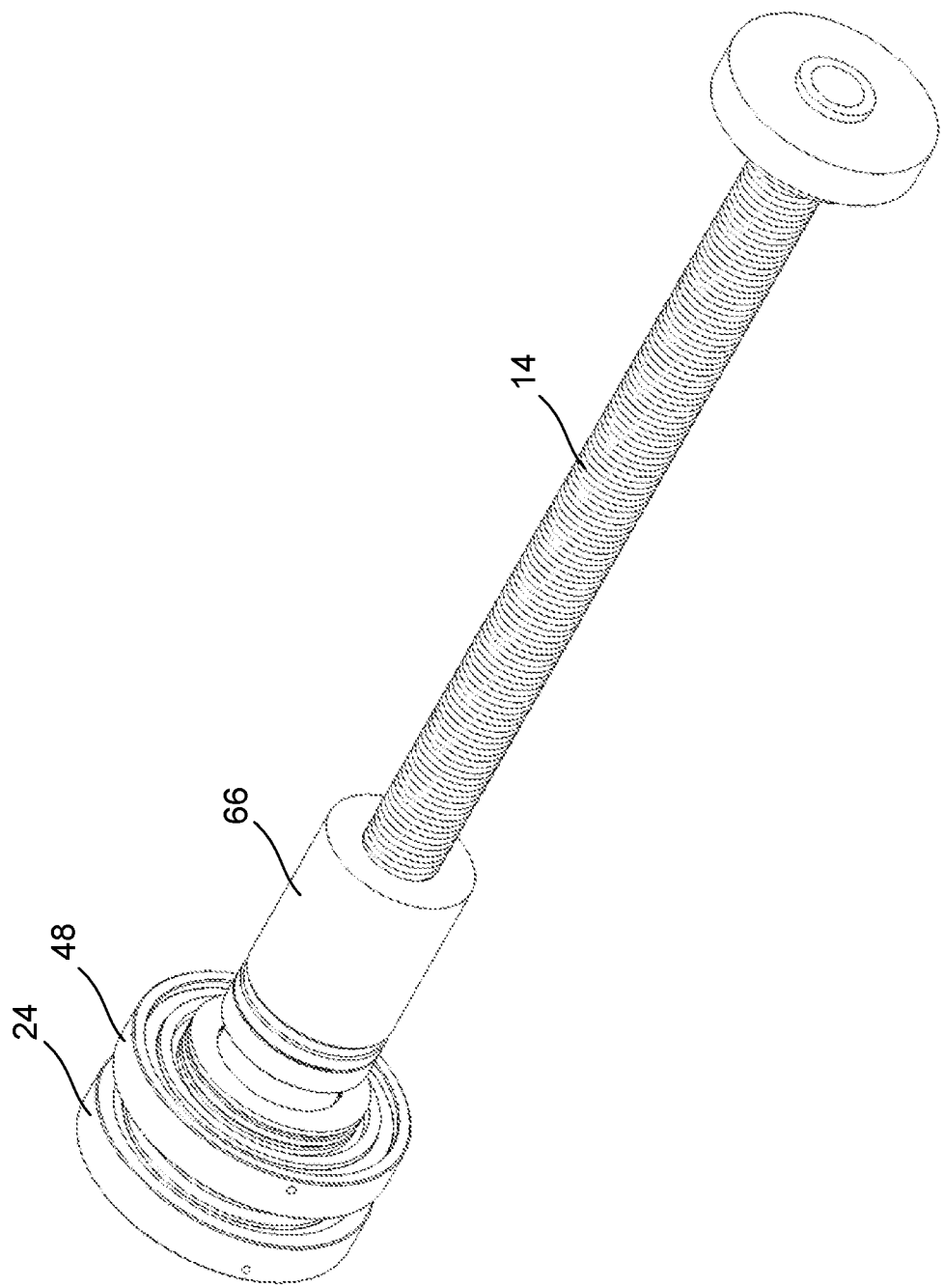
Figure 20:
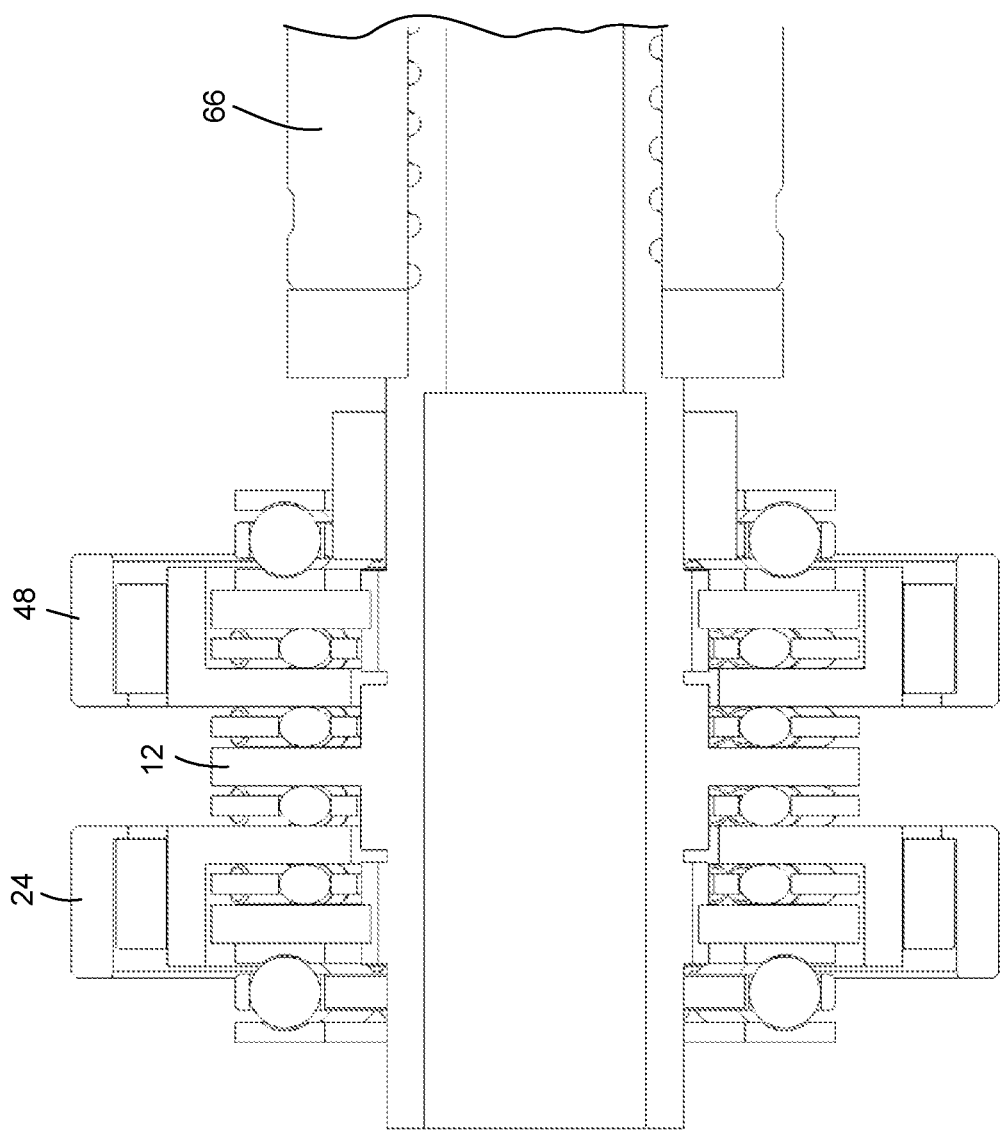

Referring to FIGS. 13-14, the operating condition 6 is described in further detail. In the depicted embodiment and operating condition, the back driving force results in tension and the motor 62 is driven counterclockwise to drive extension. The right side of the no-back system 10 is engaged. The motor 62 overcomes the friction on the right side of the no-back system 10 to drive the extension. It should be appreciated that many other alternative configurations are also possible.

Referring to FIGS. 16-20, additional drawings of the actuator 60 described above are shown. Like reference numbers are used to describe like features. As such, these additional figures are not additionally described herein.

Figure 21:
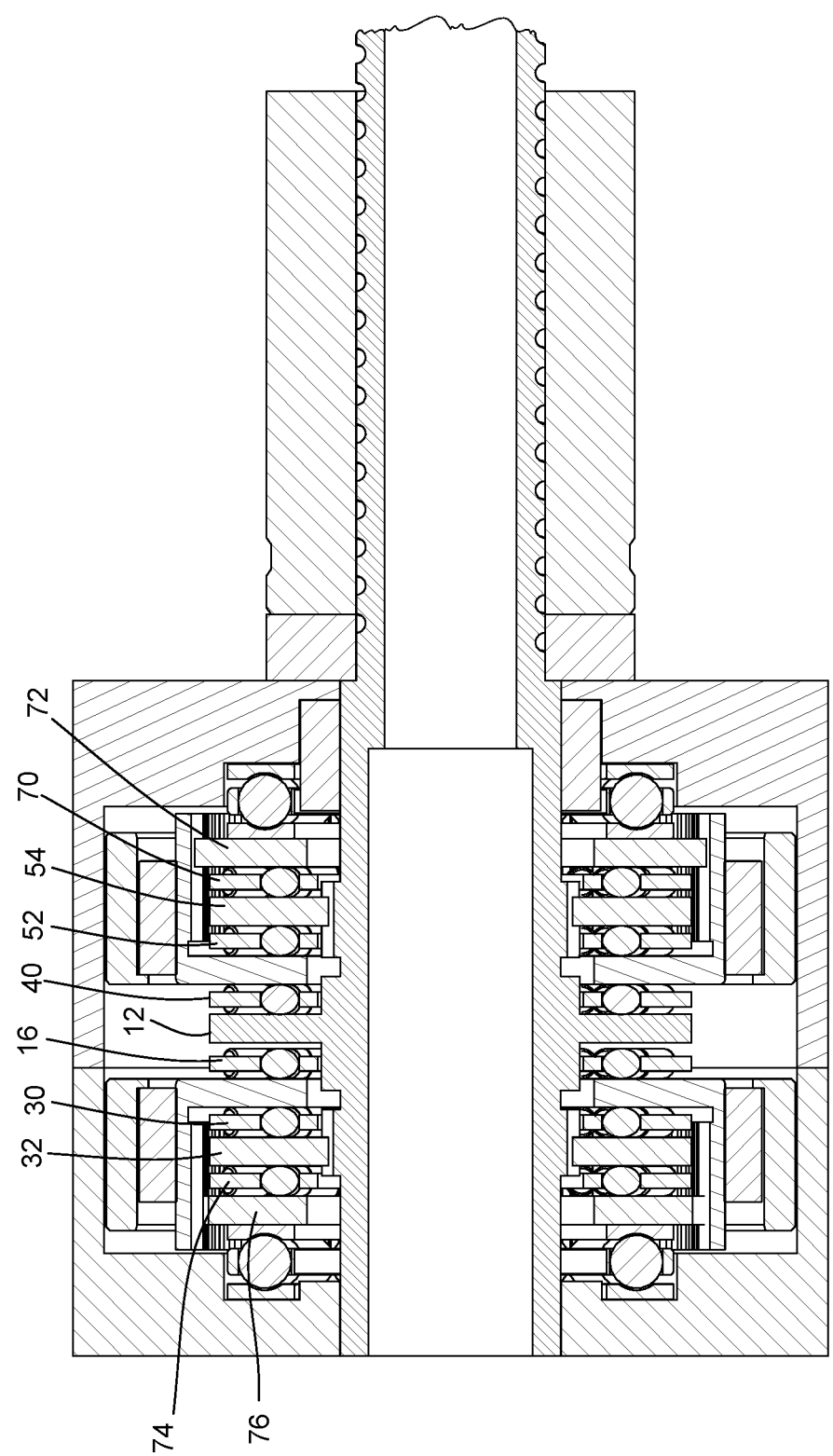
FIG. 21 is a cross-section of an alternative embodiment of an actuator according to the principles of the present disclosure.

Referring to FIG. 21, an alternative embodiment of an actuator according to the present disclosure is shown. In the depicted embodiment, the actuator screw has a longer lead. Accordingly, the actuator is configured to move at a higher rate of speed. To account for the longer lead on the screw, the internal no-back assembly is configured to have increased torque resisting capabilities. In the depicted embodiment, the no-back assembly has many of the same features of the no-back system described above. As such, the like components share the same reference numbers.

In the embodiment depicted in FIG. 21, the actuator includes auxiliary first and second skewed rollers 70, 74 and auxiliary first and second disks 72, 76. These additional components added to the "brake pack" results in a configuration that has higher torque resistance. In the depicted embodiment, the auxiliary first and second disks 72, 76 are splined or otherwise configured to rotate (or not rotate) with the first and second static disks 44, 20. The auxiliary first and second skewed rollers 70, 74 selectively provide friction between the first and second static disks 44, 20 and the first and second disk members 54, 32. It should be appreciated that any number of additional disks can be added to further increase the torque resistance of the no-back assembly to accommodate faster lead screws.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An electromechanical actuator with a no-back system comprising:
   a housing;
   a ball screw drive shaft including a first end portion and a second end portion, the first end portion being threaded and configured to drive a nut linearly along the ball screw drive shaft when the ball screw drive shaft is rotated about a ball screw drive shaft axis;
   a bearing assembly rotatably supporting the second end portion of the ball screw drive shaft in the housing, the bearing assembly configured to constrain axial translation of the second end portion of the ball screw drive shaft within the housing;

a radially extending ball screw flange extending radially from the second end portion of the ball screw drive shaft;

a first static disk located on a first side of the radially extending ball screw flange, the first static disk providing a first static disk clutch engagement cylindrical surface, a first static disk first tension skewed roller engagement surface, and a first static disk second tension skewed roller engagement surface;

a first disk member splined to the second end portion of the ball screw drive shaft and configured to rotate with the ball screw drive shaft;

a first tension skewed roller assembly positioned between the radially extending ball screw flange and the first static disk first tension skewed roller engagement surface of the first static disk;

a second tension skewed roller assembly positioned between the first static disk second skewed roller engagement surface of the first static disk and the first disk member;

a first clutch positioned between the first static disk clutch engagement cylindrical surface and the housing such that it allows the first static disk to freely rotate in a first direction;

a second static disk located on a second side of the radially extending ball screw flange, the second static disk providing a second static disk clutch engagement cylindrical surface, a second static disk first compression skewed roller engagement surface, and a second static disk second compression skewed roller engagement surface;

a second disk member splined to the second end portion of the ball screw drive shaft and configured to rotate with the ball screw drive shaft;

a first compression skewed roller assembly positioned between the radially extending ball screw flange and the second static disk first compression skewed roller engagement surface of the second static disk;

a second compression skewed roller assembly positioned between the second static disk second compression skewed roller engagement surface of the second static disk and the second disk member; and a second clutch positioned between the second static disk clutch engagement cylindrical surface and the housing such that it allows the second static disk to freely rotate in a second direction.

2. The actuator of claim 1, wherein the ball screw drive shaft is threaded and a nut is provided on that shaft.

3. The actuator of claim 1, wherein the first clutch is a sprag clutch and wherein the second clutch is a sprag clutch.

4. The actuator of claim 1, wherein the bearing assembly includes a first thrust bearing and a second thrust bearing.

5. The actuator of claim 1, wherein the first and second roller engagement surfaces of the first static disk are perpendicular to the clutch engagement surface and wherein the first and second skewed roller engagement surfaces are parallel.

6. The actuator of claim 1, wherein a motor is configured to cause the first tension skewed roller to slide relative to the first static disk when a tension back driving force is applied to the ball screw drive shaft and the actuator is driven to extend.

7. The actuator of claim 1, wherein the clutch allows the first static disk to freely rotate with the ball screw drive shaft relative to the housing when a tension back driving force is applied to the ball screw drive shaft and the actuator is driven to retract.

8. The actuator of claim 6, wherein the motor is configured to cause the first compression skewed roller to slide relative to the second static disk when a compressive back driving force is applied to the ball screw drive shaft and the actuator is driven to retract.

9. The actuator of claim 1, wherein the second clutch allows the second static disk to freely rotate with the ball screw drive shaft relative to the housing when a compression back driving force is applied to the ball screw drive shaft and the actuator is driven to extend.

10. The actuator of claim 6, wherein motor generated torque is not relied on to resist back driving forces.

11. The actuator of claim 1, wherein the actuator resists compressive and tension back driving forces mechanically and passively.

12. The actuator of claim 1, wherein a brake is normally on whenever back driving forces are imparted on the ball screw drive shaft.

13. The actuator of claim 1, further comprising a first auxiliary static disk splined to rotate with the first static disk and a first auxiliary skewed roller positioned between the first auxiliary static disk and the first disk member.

14. The actuator of claim 13, further comprising a second auxiliary static disk splined to rotate with the second static disk and a second auxiliary skewed roller positioned between the second auxiliary static disk and the second disk member.

15. An electromechanical actuator with a no-back system comprising:

a housing;

a first body including a first end portion and a second end portion, the first end portion being threaded and configured to drive a second body linearly along the first body, the first body rotated about a central axis;

a bearing assembly rotatably supporting the second end portion of the first body in the housing, the bearing assembly configured to constrain axial translation of the second end portion of the first body within the housing;

a radially extending flange extending radially from the second end portion of the first body;

a first static disk located on a first side of the radially extending flange, the first static disk providing a first static disk clutch engagement cylindrical surface, a first static disk first skewed roller engagement surface, and a first static disk second skewed roller engagement surface;

a first disk member splined to the second end portion of the first body and configured to rotate with the first body;

a first skewed roller assembly positioned between the radially extending flange and the first static disk first skewed roller engagement surface of the first static disk;

a second skewed roller assembly positioned between the first static disk second skewed roller engagement surface of the first static disk and the first disk member; and a first clutch positioned between the first static disk clutch engagement cylindrical surface and the housing such that it allows the first static disk to freely rotate in a first direction.

16. The actuator of claim 15, wherein the first body is a ball screw drive shaft and the second body is a nut.

17. The actuator of claim 15, further comprising:
- a second static disk located on a second side of the radially extending ball screw flange, the second static disk providing a second static disk clutch engagement cylindrical surface, a second static disk third skewed roller engagement surface, and a second static disk fourth skewed roller engagement surface;
- a second disk member splined to the second end portion of the ball screw drive shaft and configured to rotate with the ball screw drive shaft;
- a third skewed roller assembly positioned between the radially extending ball screw flange and the second static disk third skewed roller engagement surface of the second static disk;
- a fourth compression skewed roller assembly positioned between the second static disk fourth compression skewed roller engagement surface of the second static disk and the second disk member; and
- a second clutch positioned between the second static disk clutch engagement cylindrical surface and the housing such that it allows the second static disk to freely rotate in a second direction.

\* \* \* \* \*

UNITED STATES PATENT AND TRADEMARK OFFICE
CERTIFICATE OF CORRECTION

| | |
|---|---|
| PATENT NO. | : 11,623,739 B2 |
| APPLICATION NO. | : 17/508569 |
| DATED | : April 11, 2023 |
| INVENTOR(S) | : Nikhil Mahesh Kulkarni and Tyler Quincey Curtis |

It is certified that error appears in the above-identified patent and that said Letters Patent is hereby corrected as shown below:

On the Title Page

Insert item (30):
--Foreign Application Priority Date
Oct. 27, 2020 (IN) 202011046739--

Signed and Sealed this
Thirteenth Day of February, 2024

Katherine Kelly Vidal
*Director of the United States Patent and Trademark Office*